July 13, 1943. B. J. KINSBURG 2,324,215
MEASURING APPARATUS
Filed April 25, 1941
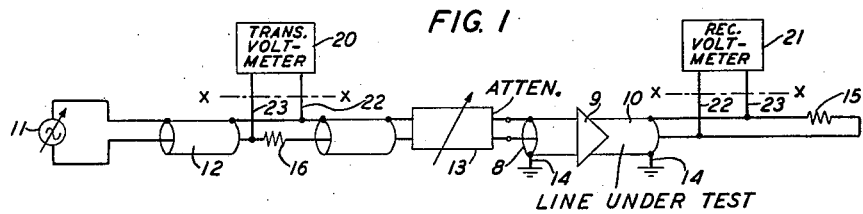
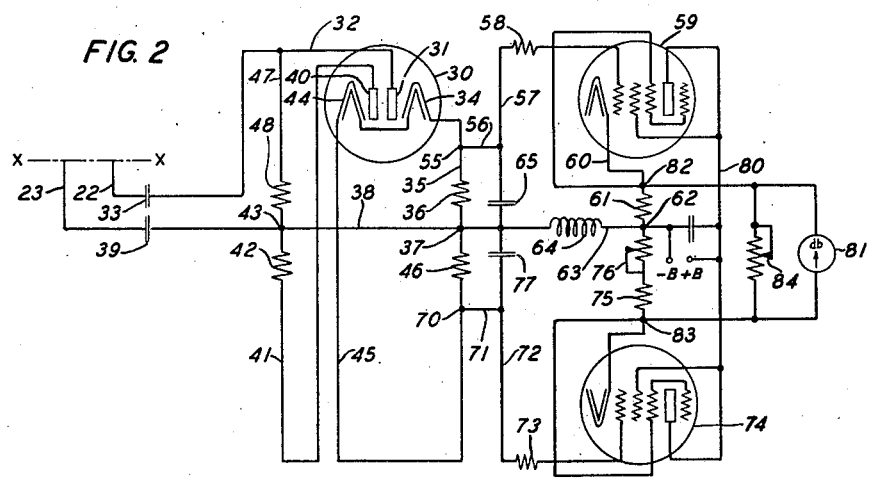
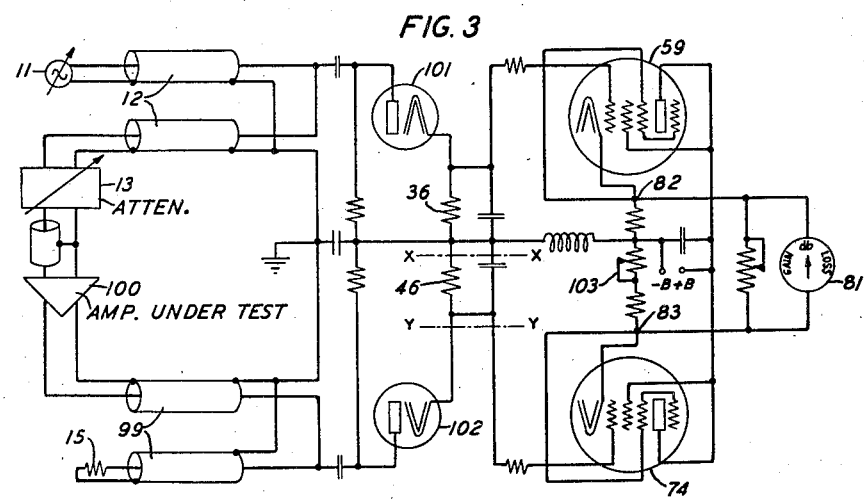
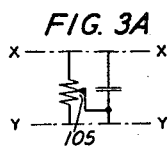
INVENTOR
B. J. KINSBURG
BY
ATTORNEY Patented July 13, 1943

2,324,215

UNITED STATES PATENT OFFICE 2,324,215

MEASURING APPARATUS

Boris J. Kinsburg, New York, N. Y., assignor to Bell Telephone Laboratories, Incorporated, New York, N. Y., a corporation of New York Application April 25, 1941, Serial No. 390,303

15 Claims. (Cl. 171—95)

This invention relates to measuring apparatus, and more particularly to a device for measuring an electrical characteristic of a tranducer unbalanced with respect to ground potential.

Heretofore, apparatus embodying thermionic devices and used for measuring electrical characteristics of transmission lines, particularly in the field, required precise calibration from time to time in order to effect accurate measurements. This is occasioned by reason of the fact that the performance of certain circuit elements such, for example, as the thermionic devices vary with aging, temperature and humidity effects, and poor regulation of the power supply. Proper calibration is expensive both with respect to the time involved and the replacement of circuit elements which appear to show a slight variation of characteristic. In the laboratory or factory, the necessary replacement elements are usually maintained in stock so that loss of time from the standpoint of the avilability of the required replacement elements is a negligible consideration. However, in the field, particularly at remote points, the necessary replacement elements may not be readily available and it may require time and trouble to get them.

Accordingly, this invention contemplates measuring apparatus which requires a relatively simple initial calibration for obtaining accurate measurements over a broad band of frequencies.

A main object of the invention is to effect expeditious measurements of electrical characteristics of transducers.

Another object is to provide measuring apparatus which has substantially uniform sensitivity over a broad band of frequencies.

Another object is to provide measuring apparatus which obviates the step of calibration for waves of different frequencies.

Another object is to achieve null measurements by balancing the space current between the thermicnic devices.

A further object is to provide low voltage terminals for connection to an indicator.

A still further object is to measure a differential voltage on a null basis.

Another object is to provide measuring apparatus that compensates for the deterioration of individual circuit elements.

Another object is to provide measuring apparatus that compensates for ambient temperature and humidity effects.

Another object is to provide measuring apparatus that compensates for variations in power supply for thermionic devices.

In a specific embodiment, the invention comprises a pair of thermionic rectifying devices arranged in a balanced relation with respect to ground potential. Connected to these rectifying devices is a pair of thermionic amplifying devices, each including a control grid, a cathode and an anode, also arranged in a balanced relation with respect to ground potential. Embodied in the cathode circuit of each amplifying device is a resistor which serves to impress effectively a biasing voltage on the control grid associated therewith. A suitable indicator is applied between both cathode resistors. An adjustable resistor in the cathode-anode circuit of one amplifying device serves to adjust the space current thereof to an amount which balances the space current of the other amplifying device to provide zero potential difference between the cathode resistors thereby providing an initial zero reading on the indicator. Circuit provisions are included to restrict the effect of the alternating and direct current grounds to the circuit portions embodying the respective transducer under test and the measuring apparatus.

A feature resides in a balanced circuit which tends to provide stability against variations of the power supply for energizing the thermionic rectifying and amplifying devices, aging of both latter devices, temperature and humidity effects on individual circuit elements, and aging of other circuit elements. Another aspect of the balanced circuit is that periodical calibration for waves of different frequencies is obviated as only one side is actively used for measuring purposes while the other side serves to stabilize the one side. Another feature is substantially uniform sensitivity over a broad band of frequencies. A further feature relates to obtaining an initial zero reading on an indicator by balancing the space current between the two amplifying devices. Thus, the indicator functions on a null basis and avoids use of a bucking-out voltage. Still another feature concerns a pair of low voltage terminals across which an indicator may be applied. A modification concerns the provision of a balanced detector for measuring the voltage difference between the input and output of a transducer.

The invention will be readily understood from the following description taken together with the accompanying drawing in which:

Fig. 1 is a schematic circuit illustrating a useful application of a specific embodiment of the invention shown in Fig. 2;

Fig. 2 is a diagrammatic circuit showing a specific embodiment of the invention utilized in Fig. 1;

Fig. 3 is a diagrammatic circuit illustrating both an alternate embodiment of the invention and a useful application thereof; and Fig. 3A is a modification which may be included in Fig. 3.

In the following description, the same reference numerals are employed to characterize identical elements appearing in the several figures of the drawing.

Fig. 1 shows an arrangement for measuring an electrical characteristic, such, for example, as the gain characteristic of a line 10 embodying one or more repeaters 9, over a certain range of frequencies, say, for example, from 50 to 3500 kilocycles. A variable oscillator 11 is connected through a coaxial conductor connection 12 and a variable calibrated attenuator 13 to one terminal of the line 10 which for the purpose of this description is a coaxial conductor, although it may also comprise other types of transmission pairs. In accordance with the usual practice in the operation of coaxial transmission systems, the opposite terminals of the outer conductor 8 of the line 10 are applied through connections 14, 14 to points at ground potential. In addition, the line 10 at the opposite terminal is terminated in a suitable network 15. Disposed in series with the inner conductor of the coaxial connection 12 is an impedance 16.

In accordance with this invention, the characteristic of the line 10 of Fig. 1 is determined by voltage measurements effected by a transmitting voltmeter 20 and a receiving voltmeter 21, both of which voltmeters are identical and illustrated in Fig. 2 which will be hereinafter explained. In this respect it is to be understood that the circuit portion shown below the line X—X in Fig. 2 may be substituted for each of the boxes 20 and 21 shown above the corresponding lines in Fig. 1 by joining the respective leads 22 and 23.

Referring to Fig. 2, a diode rectifier 30 has anode 31 connected by a lead 32 and capacitor 33 to the lead 22, and associated cathode 34 by lead 35 including resistor 36, terminal 37, lead 38 and capacitor 39 to the lead 23; and anode 40 connected by lead 41 including resistor 42, terminal 43, lead 38 and capacitor 39 to the lead 23, and associated cathode 44 by a lead 45 including resistor 46, terminal 37, lead 38 and capacitor 39 to the lead 23. Lead 47 including resistor 48 bridges lead 32 and terminal 43.

Terminal 55 on one side of resistor 36 is applied through leads 56 and 57 including resistor 58 to the control grid of direct current amplifier 59 whose cathode is connected by lead 60 embodying resistor 61, terminal 62, lead 63 embodying inductance 64 to the terminal 37 which is common to the other side of the resistor 36. Capacitor 65 shunts the resistor 36. Terminal 70 on one side of the resistor 46 is connected through lead 71, lead 72 including resistor 73 to the control grid of direct current amplifier 74 whose cathode is joined by fixed resistor 75 and variable resistor 76 to the terminal 62 and thence by the lead 63 and inductance 64 to the terminal 37 which is common to the other side of the resistor 46. Capacitor 77 bridges the resistor 46.

The anodes of both amplifiers 59 and 74 are joined by a lead 80. The anode battery, not shown, is impressed across terminals —B and +B.

A suitable meter 81 calibrated preferably in decibels is applied to corresponding terminals 82 and 83 of the respective cathode resistors 61 and 75. A variable resistor 84 is arranged in bridge of the meter 81.

In the operation of Figs. 1 and 2, variable resistor 76 in each of the voltmeters 20 and 21 is initially adjusted at no input from the oscillator 11, as a preliminary step, to balance the amount of space current of amplifier 74 against the amount of space current of amplifier 59, thereby to produce an initial zero reading on the meter 81. This provides terminals 82 and 83 in the space current circuits of the respective amplifiers 59 and 74 with the same potential, or, in other words, a zero difference of potential between the terminals 82 and 83. Accordingly, a zero reading is initially produced on both the respective transmitting and receiving voltmeters 20 and 21, Fig. 1. Next, a calibrating alternating current wave of a frequency within the test range and of certain amplitude is applied to both voltmeters 20 and 21, Fig. 1. The variable resistor 84, Fig. 2, is adjusted to produce the same preassigned reading on the meter 81 of both voltmeters 20 and 21. This calibrating wave may be produced by the oscillator 11 or an independent wave generator, not shown. Thus, the variable resistor 84 establishes an amplitude calibration of the meter 81 embodied in both voltmeters 20 and 21, Fig. 1.

The variable oscillator 11 is then actuated to supply successive individual alternating current waves to the line 10 in desired frequency steps over the desired range of frequencies. The attenuator 13 is adjusted at each test frequency to control the amount of attenuation to compensate for the gain of the transmission line 10. The readings on the voltmeters 20 and 21 of Fig. 1 are noted. In this connection, the attenuator 13 is adjusted such that the initial preassigned reading is maintained on the voltmeter 21 for each test frequency, which reading is utilized as a reference point for the entire range of test frequencies. The summation of the settings of the attenuator 13 and the readings of the voltmeter 20 at each test frequency is utilized to represent the gain of the transmission line 10.

The operation of Fig. 2 is such that the test waves are rectified in the rectifying circuit comprising anode 31 and associated cathode 34, and therefore rectified voltage appears across the resistor 36. This voltage is impressed on the control grid-cathode circuit of the amplifier 59 to cause a change in the amount of space current in the amplifier 59. As the space current of the latter amplifier does not now balance the space current of the amplifier 74, a difference of potential is caused to exist across the terminals 82 and 83. The magnitude of such potential differences will depend on whether the amount of space current of amplifier 59 is larger or smaller than the amount of space current of the amplifier 74. The difference between such amounts will be reflected as changes in the reading of the meter 81, as it will be presently pointed out.

Thus, the initial zero potential difference across the terminals 82 and 83 indicates a condition of balance in the circuit of Fig. 2, or a condition of no input voltage to the line 10 under test. As the latter, however, is supplied with an alternating current voltage from the source 11, the rectified voltage effected across the resistor 36, Fig. 2, serves to vary the effect of the biasing voltage applied to the control grid of the amplifier 59 of the cathode resistor 61. This causes a change in the space current of the amplifier 59, and therefore an unbalance with respect to the space current of the amplifier 74. Consequently, a difference of potential is caused to exist across the terminals 82 and 83 which potential difference is reflected in the reading of the meter 81, as previously mentioned. Accordingly, the magnitude of the rectified voltage produced across the resistor 36, or in other words, the amount of unbalance between the space current of the amplifiers 59 and 74, represents the magnitude of the voltage at a certain point on the line 10.

Although the voltmeter circuit of Fig. 2 appears to be balanced, one side only is employed for measuring purposes. Accordingly, the one circuit portion comprising anode 31 and associated cathode 34 of the rectifier 30 and the amplifier 59 are actively utilized for respective rectification and amplification of the test waves. The remaining circuit portion embodying anode 40 and cathode 44 of the rectifier 30 and the amplifier 74 serve (1) to provide space current to balance the space current of the amplifier 59, when the oscillator 11 is disconnected from the line 10, that is, in a condition of no input, and (2) to provide stabilization in the sense of compensating for variations of the energizing voltages for thermionic rectifiers and amplifiers, temperature and humidity effects, aging and other variables which may cause variations in the performance of the individual circuit elements of the voltmeter of Fig. 2. Thus, for example, variations in heater voltage affect both diodes of rectifier 30 to the same extent so that the same changes are caused in the effective voltages impressed on the control grids of the respective amplifiers associated therewith; and variations in heater voltage affect both amplifiers to the same extent. Hence, the variations in heater voltage do not change the relative potentials of the corresponding points 82 and 83 in each of the voltmeters 20 and 21, and in effect are canceled. Consequently, any variable quantity which tends to influence the performance of one diode rectifier and/or one of the two amplifiers also tends to influence to the same extent the performance of the other diode rectifier and/or the other of the two amplifiers. The net result of such influences is such that the relative potentials of the corresponding points 82 and 83 in each of the volmeters 20 and 21 are unchanged. Thus, the voltmeter of Fig. 1 involves a relatively simple initial step of calibration for obtaining accurate measurements over a broad band of frequencies, provides substantially uniform sensitivity, that is, flat frequency characteristic, over a broad band of frequencies, and obviates the necessity of calibrating for individual waves of different frequencies.

The resistors 61 and 75 embodied in the cathode circuit of the respective amplifiers 59 and 74 serve to provide voltages which in effect bias the control grids thereof. These self-biasing resistors provide (1) an additional degree of stability by furnishing a direct current feedback arising from a stabilizing effect of the total space current for any variation thereof such that the space current produces a variation in the biasing voltage in a direction tending to compensate for the variation of the space current. That is, an increase of space current causes a corresponding increase of biasing voltage and a decrease of space current causes a corresponding decrease of biasing voltage; and (2) low voltage terminals for the meter 81. The capacitors 33 and 39 and inductance 64 isolate the respective alternating current ground potentials of the line 10 under test, Fig. 1, from the direct current ground potentials of the voltmeter circuit, Fig. 2.

Fig. 3 shows a modification of the invention arranged as a differential voltmeter which is particularly useful for effecting voltage measurements across a transducer whose input and output terminals are located at the same point. In this illustration the voltage across amplifier 100 is to be measured. For this purpose the measuring circuit of Fig. 3 is substantially identical with that of Fig. 2 except in the respect that the former circuit is arranged as a null indicator, as it will be presently pointed out. The variable oscillator 11 is applied through coaxial conductor connection 12 and calibrated attenuator 13 to the input of the amplifier 100 whose output is connected to coaxial conductor connection 99 which is suitably terminated with network 15. Across the input coaxial connection 12 are in sequence a thermionic rectifier 101 and thermionic amplifier 59; and across the output coaxial connection 99 are in sequence a thermionic rectifier 102 and the thermionic amplifier 74.

In operation, the circuit of Fig. 3 is initially arranged at no input from oscillator 11 such that variable resistor 103 in the space current circuit of amplifier 74 adjusted to balance the space current of amplifier 74 against the space current of amplifier 59. This provides a zero reading on the meter 81. The variable oscillator 11 then supplies the first test wave to the input of the amplifier 100. The rectified voltage across the resistors 36 and 46 varies the effective biasing voltages on the control grids of the respective amplifiers 59 and 74, and thereby causes unbalance space current therebetween. Across the terminals 82 and 83 this produces a potential difference whose magnitude is reflected in the change of the reading of the meter 81. The attenuator 13 is now varied until the space current of the amplifier 74 balances the space current of the amplifier 59. The reading on the calibrated attenuator 13 is noted. This procedure is repeated for desired individual frequencies extending over the test range of frequencies. The settings of the calibrated attenuator 13 show the gain characteristic of the amplifier 100 over the test range of frequencies.

Fig. 3A illustrates a modification which may be included in Fig. 3, and for this purpose it is understood that the portion shown between the lines X—X and Y—Y of Fig. 3A may be substituted for the portion shown between the corresponding lines of Fig. 3. Referring to Fig. 3A, potentiometer 105 is calibrated to effect a more accurate null balance on the meter 81 of Fig. 3, and thereby a more accurate determination of the gain characteristic of the amplifier 100 as mentioned above in connection with Fig. 3. In this connection, the settings of both the attenuator 13 and potentiometer 105 serve to provide the gain characteristic of the amplifier 100.

What is claimed is:

1. Apparatus for measuring the magnitude of an electrical quantity, comprising means to detect the electrical quantity, said detecting means including two vacuum tubes connected in a balanced relation with respect to ground potential such that one tube is responsive to the electrical quantity to be measured and the other tube is unresponsive thereto, each tube embodying a control grid and a cathode, a resistor individual to each cathode and responsive to the space current in the respective tubes to apply an effective biasing potential to the control grids associated therewith, and means applied between a corresponding point on each of said cathode resistors to indicate the difference voltage to ground between said corresponding points as representative of the magnitude of the electrical quantity to be measured.

2. The measuring apparatus according to claim 1 in which voltage equilibrium between said corresponding cathode resistor points produces a certain reading on said indicating means to represent an initial magnitude of the electrical quantity, and a difference voltage between said corresponding cathode resistor points produces such variation in the certain reading on said indicating means as to represent the change in the magnitude of the electrical quantity with respect to the initial magnitude thereof.

3. The measuring apparatus according to claim 1 in which the voltage to ground of the corresponding point on the cathode resistor associated with said one tube is controlled by the electrical quantity, and the voltage to ground of the corresponding point on the cathode resistor associated with said other tube is substantially independent of the electrical quantity.

4. Apparatus for measuring the magnitude of an electrical quantity, comprising a pair of diode rectifiers connected in a balanced relation with respect to ground potential, a pair of thermionic amplifying devices connected in a balanced relation with respect to ground potential, each of said amplifying devices including a control grid and a cathode, circuit means to connect said rectifiers and said amplifying devices such that one diode rectifier and one amplifying device are effective to rectify the electrical quantity to be measured and to amplify the rectified electrical quantity, respectively, and such that the other diode rectifier and the other amplifying device are unresponsive to the electrical quantity to be measured, a resistor individual to each cathode and responsive to the space current in the respective amplifying devices to impress effectively a biasing voltage on the control grids associated therewith, and means connected across corresponding points of said cathode resistors to indicate the difference voltage to ground thereacross as representative of the magnitude of the electrical quantity to be measured.

5. Apparatus for measuring the magnitude of an electrical quantity, comprising means to detect said electrical quantity, said detecting means including two vacuum tubes connected in a balanced relation with respect to ground potential such that one tube is responsive to the electrical quantity to be measured and the other tube is unresponsive thereto, each tube embodying a control grid and a cathode, a resistor individual to the cathodes of said one and other tubes and responsive to the space current in the respective tubes to impress effectively a biasing voltage on the control grids associated therewith, variable resistive means connected in series with the cathode resistor of said other tube to control the amount of space current therein such that an initial magnitude of the electrical quantity provides a substantially zero difference voltage to ground across corresponding points of said cathode resistors, and a subsequent changing magnitude of the electrical quantity provides a proportionately varying difference voltage to ground across said corresponding cathode resistor points, and means to indicate the difference voltage to ground across said corresponding cathode resistor points.

6. Apparatus for measuring the magnitude of an electrical quantity, comprising a pair of diode rectifiers, a pair of triode amplifiers, each including a control grid, a cathode and an anode, circuit means to connect said rectifiers and said amplifiers in a balanced relation with respect to ground potential, further circuit means to connect said rectifiers and said amplifiers such that one rectifier and one amplifier are responsive to the electrical quantity to be measured and the other rectifier and the other amplifier are unresponsive thereto, a resistive element individual to the cathodes of said one and other amplifiers and responsive to the anode current in the respective amplifiers for applying an effective biasing voltage to the control grids associated therewith, means applied between a corresponding point on each of said cathode resistors to indicate the difference voltage to ground therebetween, and a variable resistive element in series with the cathode resistor associated with said other amplifier for balancing the amount of anode current therein against the amount of anode current in said one amplifier to produce a zero difference voltage to ground between said corresponding cathode resistor points which difference voltage represents a substantially constant magnitude of the electrical quantity to be measured whereby initially a preselected reading is produced on said indicating means, and a subsequent changing unbalance of the amounts of anode current in both said amplifiers produces a varying difference voltage to ground between said corresponding cathode resistor points which voltage difference represents a proportionately varying magnitude of the electrical quantity to be measured whereby corresponding changes are produced in said preselected reading on said indicating means.

7. Apparatus for measuring the magnitude of an electrical quantity, comprising means to detect an electrical quantity, said detecting means including two vacuum tubes connected in a balanced relation with respect to ground potential such that one tube is responsive to the electrical quantity to be measured and the other tube is unresponsive thereto, each tube embodying a control grid and a cathode, a resistor individual to the cathodes of said one and other tubes and responsive to the space current in the respective tubes to apply an effective biasing voltage to the control grids associated therewith, variable resistive means connected in series with the cathode resistor of said other tube to balance the amount of space current therein against the amount of space current in said one tube to represent a certain initial magnitude of the electrical quantity to be measured, and subsequent variations in the amount of space current in said one tube relative to the amount of space current in said other tube are caused by proportionately changing magnitudes of the electrical quantity to be measured, and means connected across a corresponding point of each of said cathode resistors to indicate the relation between the amounts of space current in both said tubes.

8. Apparatus for measuring the difference between the magnitudes of an electrical quantity at two different points, comprising a pair of diode rectifiers connected in a balanced relation with respect to ground potential, a pair of amplifier tubes connected in a balanced relation with respect to ground potential, each amplifier tube embodying a control grid and a cathode, circuit means to connect one diode rectifier to respond to the magnitude of the electrical quantity at one of said two different points and the other diode rectifier to respond to the magnitude of the electrical quantity, at the other of said different points, further circuit means to connect one amplifier tube to said one diode rectifier and the other amplifier tube to said other diode rectifier, a resistor individual to the cathodes of said one and other amplifier tubes and responsive to the space current in the respective amplifier tubes to impress an effective biasing potential on the control grids associated therewith, variable resistive means disposed in series with the cathode resistor of said other amplifier tube to adjust the amount of space current therein, in the absence of the electrical quantity whose difference magnitude is to be measured, until substantial equilibrium with the amount of space current in said one amplifier tube is attained so that thereafter relative unbalance between the amounts of space current in both said amplifier tubes is produced in proportion to the difference magnitude of the electrical quantity between said one and other different points, and means applied between a corresponding point on each of said cathode resistors to indicate said equilibrium and unbalance amounts of space current in both of said amplifier tubes.

9. Apparatus for measuring the difference between the magnitudes of an electrical quantity at two different points, comprising a pair of diode rectifiers connected in a balanced relation with respect to ground potential, a pair of amplifier tubes connected in balanced relation with respect to ground potential, each amplifier tube embodying a cathode and a control grid, circuit means to connect one diode rectifier and one amplifier tube to respond to the magnitude of the electrical quantity at one of said two different points and the other diode rectifier and the other amplifier tube to respond to the magnitude of the electrical quantity at the other of said two different points, a resistive element individual to the cathodes of said one and other amplifier tubes and responsive to space current in the respective amplifier tubes to apply an effective biasing potential to the control grids associated therewith, means connected to a corresponding point on each of said cathode resistive elements to indicate the difference voltage to ground between said corresponding points, and variable resistive means disposed in series with the cathode resistance element of said other amplifier tube to adjust the voltage to ground on said corresponding point of said latter element such that, in the absence of the electrical quantity, no difference voltage to ground exists across said corresponding points of said cathode resistive elements to produce a certain reading on said indicating means, and, in the presence of the electrical quantity, a difference voltage to ground exists across said corresponding points of said cathode resistive elements to produce a different reading on said indicating means.

10. The measuring apparatus according to claim 9 in which a potentiometer is disposed in said circuit means at a point between said other diode rectifier and said other amplifier tube.

11. A system for measuring the magnitude of an electrical quantity, comprising a source of the electrical quantity unbalanced to ground potential and whose magnitude is to be measured, and means to detect the electrical quantity, including a pair of triode amplifiers, each amplifier embodying a control grid, a cathode, and an anode, circuit means to connect said amplifiers to said source in a balanced relation with respect to ground such that one amplifier is responsive to the electrical quantity and the other amplifier is unresponsive thereto, a resistor individual to the cathode of each amplifier and responsive to the anode current in the respective amplifiers to impress an effective biasing potential on the control grids associated therewith, means applied between a corresponding point on each of said cathode resistors to indicate the difference voltage to ground across said corresponding points, and variable resistive means connected in series with said cathode resistor of said other amplifier to adjust the voltage to ground on said corresponding point of said latter cathode resistor, when said source is ineffective, until a condition of equilibrium with the voltage to ground on said corresponding point of said cathode resistor associated with said one tube is attained so that, when said source is effective, a difference voltage to ground is produced across said corresponding cathode resistor points in proportion to the magnitude of the electrical quantity supplied by said source.

12. A system for measuring the magnitude of an electrical quantity, comprising a concentric conductor having the outer conductor at ground potential for transmitting the electrical quantity whose magnitude is to be measured, a pair of diode rectifiers balanced with respect to ground potential, a pair of vacuum tubes balanced with respect to ground potential, each tube embodying a control grid and a cathode, circuit means to connect said rectifiers and said tubes to said conductor such that one rectifier and one tube are responsive to the electrical quantity and the other rectifier and other tube are unresponsive to the electrical quantity, a resistor individual to the cathodes of said one and other tubes and responsive to the space current in the respective tubes to impress an effective biasing potential on the control grids associated therewith, variable resistive means disposed in series with said cathode resistor of said other tube to adjust the amount of space current therein with respect to the amount of space current in said one tube such that a condition of substantially zero difference voltage to ground is produced across a corresponding point on each of said cathode resistors to represent initially a certain magnitude of the electrical quantity, and such that an unbalance between the amounts of space current in both said tubes produces a proportionate difference voltage across said corresponding cathode resistor points to represent a corresponding change in said certain magnitude of said electrical quantity, and means to indicate said difference voltage across said corresponding cathode resistor points.

13. A system for measuring the difference between the magnitudes of an electrical quantity at two different points, comprising a concentric conductor having an outer conductor at ground potential for transmitting said electrical quantity whose differential magnitude is to be measured, a pair of diode rectifiers connected in a balanced relation with respect to ground potential, a pair of amplifier tubes connected in a balanced relation with respect to ground potential, each tube including a control grid, a cathode and an anode, circuit means to connect one rectifier and one amplifier tube to one point on said conductor, further circuit means to connect the other rectifier and other amplifier tube to a different point on said conductor, a resistor individual to the cathodes of said one and other amplifier tubes and responsive to the anode current in the respective amplifier tubes to impress an effective biasing potential on the control grids associated therewith, a variable resistor disposed in series with said cathode resistor of said other amplifier tube to balance the amount of anode current therein against the amount of anode current in said one amplifier tube such that when no electrical quantity is being transmitted on said conductor a substantially zero difference voltage to ground is provided across corresponding points on said cathode resistors, and such that when the electrical quantity is being transmitted on said conductor a changing unbalance between the amounts of anode current in both said tubes produces a proportionately varying difference voltage to ground across said corresponding cathode resistor points, and means to indicate said difference voltages across said corresponding cathode resistor points.

14. A system for obtaining a characteristic of electrical apparatus for transmitting an electrical quantity, comprising means at each of two spaced points on said apparatus to detect simultaneously the magnitude of the electrical quantity effective thereat, said detecting means at each of said spaced points including a pair of electron devices, each embodying a control grid and a cathode, said pair of devices being connected in a balanced relation with reference to ground potential such that one device is responsive to the electrical quantity and the other device is unresponsive to the electrical quantity, a resistor individual to each of said cathodes and responsive to the space current in the respective devices to apply an effective biasing potential to the control grids associated therewith, and means applied across corresponding points of said cathode resistors to indicate the difference voltage to ground across said corresponding points as representative of the magnitude of the electrical quantity at one of said two spaced points, the difference between the magnitudes of the electrical quantity indicated simultaneously at both said spaced points providing a measure of the characteristic of said apparatus.

15. A system for obtaining a characteristic of electrical apparatus for transmitting an electrical quantity, comprising means at each of two spaced points on said apparatus to detect simultaneously the magnitude of the electrical quantity effective thereat, said detecting means at each of said spaced points, comprising a pair of diode rectifiers, a pair of electron tubes each including a control grid and a cathode, circuit means to connect said rectifiers and said electron tubes in a balanced relation with reference to ground potential such that one diode rectifier and one electron tube are responsive to the electrical quantity and such that the other diode rectifier and other electron tube are unresponsive to the electrical quantity, a resistor individual to said cathodes of said one and other electron tubes and responsive to the space current in the respective electron tubes to apply an effective biasing voltage to the control grids associated therewith, variable resistance means connected in series with the cathode resistor of said other electron tube to control the amount of space current flowing therein such that an initial magnitude of the electrical quantity provides substantially a zero difference voltage to ground across corresponding points of said cathode resistors and such that a subsequent magnitude of the electrical quantity provides a proportionate difference voltage to ground across said corresponding cathode resistor points, and means to indicate the difference voltage to ground across said corresponding cathode resistor points as representative of the magnitude of the electrical quantity at one of said spaced points, the difference between the magnitudes of the electrical quantity indicated simultaneously at both said spaced points providing an indication of the characteristic of said apparatus.

BORIS J. KINSBURG.